UNITED STATES PATENT OFFICE.

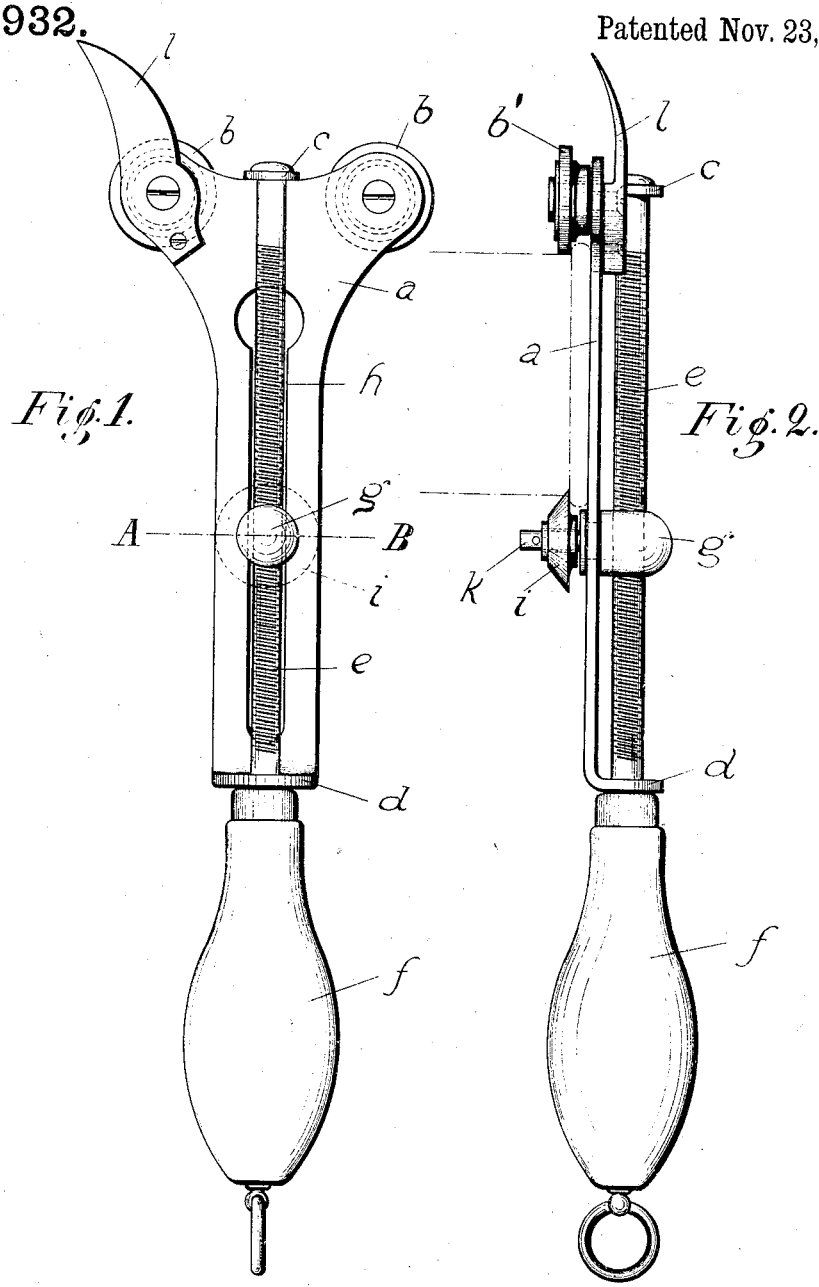

WILHELM GOTTFRIED KIRCHER, OF SOLINGEN, GERMANY.

CAN-OPENER.

940,932.     Specification of Letters Patent.     Patented Nov. 23, 1909.

Application filed May 18, 1909. Serial No. 496,795.

*To all whom it may concern:*

Be it known that I, WILHELM GOTTFRIED KIRCHER, a subject of the German Emperor, residing at Solingen, Germany, have invented new and useful Improvements in Can-Openers, of which the following is a specification.

The present invention relates to an opener for cans and similar articles, which is of simple construction and permits cans to be conveniently and rapidly opened.

The accompanying drawing, in which similar letters refer to similar parts throughout the several views, represents a form of embodiment of the new can opener.

Figure 1 demonstrates the contrivance in plan-view. Fig. 2 is a side view of it and Fig. 3 is illustrative of a section taken on line A—B in Fig. 1.

The contrivance consists of a frame or plate $a$ having on the one hand guide-rolls $b$ mounted thereto and which is provided at both extremities with bent edges $c$, $d$. In these bent edges a threaded spindle $e$ is free to turn, not, however, to slide. This spindle carrying at its one end a handle $f$ has placed on it a screw-threaded body $g$, being shiftably guided in a slot $h$ of the plate $a$ and having on the other side of the plate a blade-disk $i$ mounted to rotate. The bearing spindle $k$ is slightly smaller than the hollow of the disk $i$ so that this is consequently movably mounted to some little extent and can turn around. The projecting rim $b'$ of the roll $b$ and the cutting-edge of the blade-disk are arranged at such distance from the bottom-face of the plate $a$, as corresponds to the thickness of the lid-rim. The edge of the blade-disk is chamfered away downwardly, that is to say, toward the side averted from the plate $a$. Secured to the plate is further a blade $l$, extending beyond the front side of the plate.

If it is now desired to open circular cans, by means of the contrivance, the plate $a$ is placed with its bottom-face on the lid. Then the blade-disk is moved toward the rolls $b$ by turning the spindle, with the effect of forcing the rolls against the lateral wall of the can while the blade itself passes through the side of the can. When now the contrivance is turned all around the can by means of the handle, the blade cuts through the shell, disjoining the lid. Owing to the rolls with the projecting slide-faces and to the blade $i$ gripping with its edges below the rim or roll of the lid, as shown in Fig. 2, the contrivance cannot slip off upwardly.

The blade is, as stated, to some extent, movably mounted, and owing to its downwardly directed beveling at the edge, it is forced with this edge, during the cutting operation, upwardly and toward the inner face of the lid, along which it is guided. This presents the advantage that the lid is cut away close to its rim even though this be of different thickness or height preventing in this manner that a portion is cut away at the same time from the tin-wall.

The blade $l$ serves the purpose of cutting away the lid from square, flat or similar cans. This contrivance is placed on the can with its front side or with the rolls $b$ slightly projecting over this respectively; then it is reciprocated like a lever and moved along the rim to be cut away, said blade being introduced under pressure into the wall during the one movement.

I claim:—

1. A can opener comprising a plate, a screw spindle journaled therein, a nut engaging said spindle, a circular cutter rotatably mounted on the nut, and a pair of guide rollers carried by the plate.

2. A can opener comprising a slotted plate having bent apertured ends, a screw spindle journaled therein, a nut on the spindle that engages the plate-slot, a pin on said nut, a circular cutter rotatable on said pin, and a pair of guide rollers carried by the plate.

3. A can opener comprising a plate, a screw spindle journaled therein, a nut engaging said spindle, a circular cutter rotatably mounted on the nut, a pair of guide rollers carried by the plate, and a knife secured to the plate in proximity to one of said rollers.

Signed by me at Barmen, Germany, this 4th day of May 1909.

WILHELM GOTTFRIED KIRCHER. [L. S.]

Witnesses:
  OTTO KÖNIG,
  C. J. WRIGHT.